Aug. 18, 1953 — W. R. SELBY — 2,649,009
DRIVE SPIKE
Filed May 2, 1951
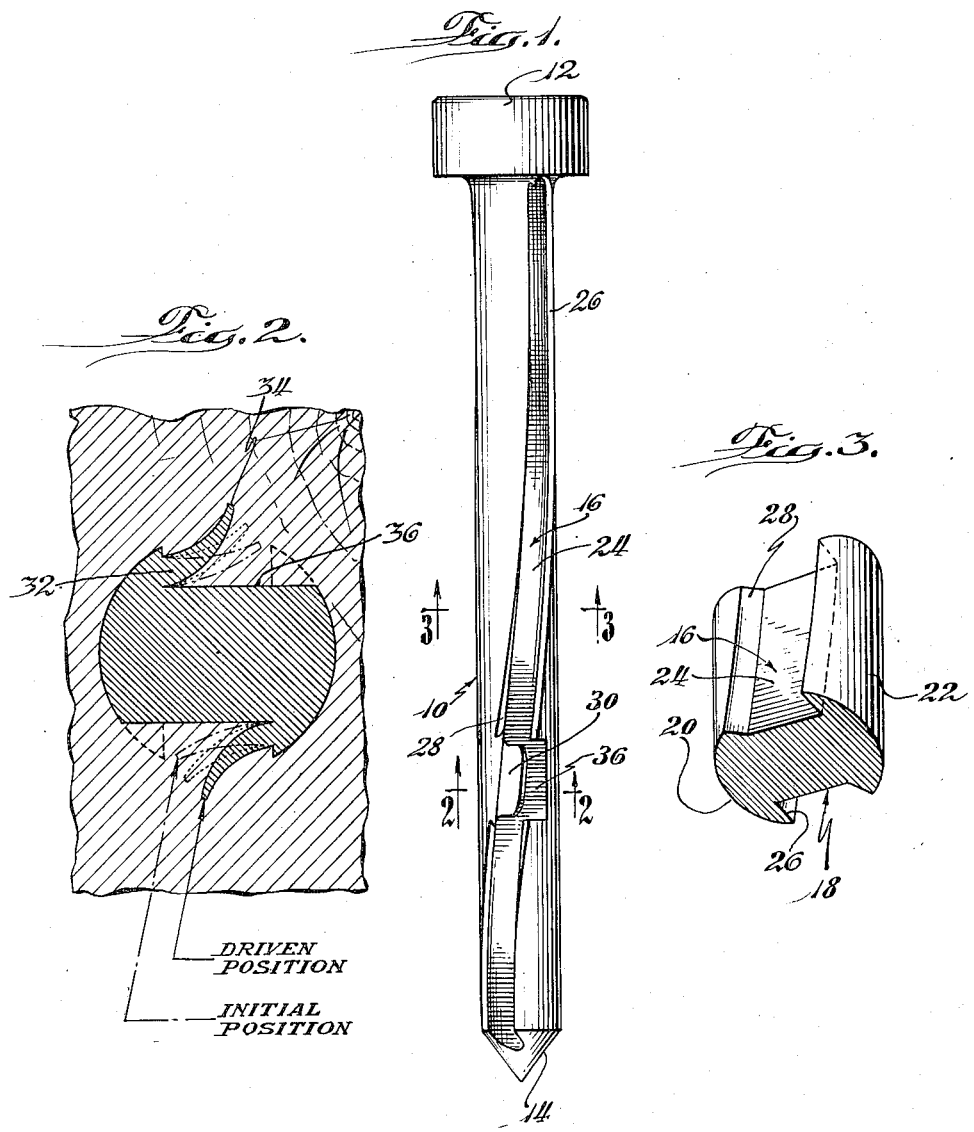
Inventor:
William R. Selby
By Warren C. Horton
Attorney.

Patented Aug. 18, 1953

2,649,009

UNITED STATES PATENT OFFICE 2,649,009

DRIVE SPIKE

William R. Selby, Springfield, Ill.

Application May 2, 1951, Serial No. 224,150

6 Claims. (Cl. 85—21)

This application is a continuation-in-part of my copending application, Serial No. 122,650, filed October 21, 1949, now abandoned.

This invention relates to fasteners, and more particularly to heavy duty spikes which are required to maintain their driven positions permanently.

An object of the invention is to provide an improved metallic spike which produces a minimum of distortion or crushing of the fibers when it is driven into wood, and which offers extreme resistance to removal from its driven position.

A further object is to provide an improved construction for a heavy duty drive spike involving a novel arrangement of helical grooves together with ears in the grooves, to prevent reverse rotation and withdrawal of the spike.

A further object is to provide a heavy duty spike including a shank having helical ribs and grooves together with integral ears in the grooves, the ears offering a minimum resistance to driving of the spike and automatically moving relative to the shank during driving to bite into the undisturbed wood surrounding the shank to provide positive resistance to any reverse rotation and thus to prevent withdrawal of the spike.

Another object of the invention is to provide a heavy duty metallic anchor spike having a novel construction particularly adapting the spike for use with bridge timbers, railroad ties, and any hard wood members of the type which are required to withstand great abuse and stress.

Other objects, advantages, and features of the invention will be apparent from the following description of an illustrative embodiment of the invention. In the course of the description reference will be made to the drawing, in which Fig. 1 is an elevation of a spike constructed in accordance with the invention;

Fig. 2 is an enlarged cross-sectional view of a driven spike, taken as indicated by the line 2—2 in Fig. 1; and Fig. 3 is an enlarged fragmentary perspective view showing a cross section as indicated by the line 3—3 in Fig. 1.

The spike illustrated in the drawings includes a shank 10 having a driving head 12 at one end, and a conically shaped penetrating point 14 at its opposite end.

The shank 10 is provided with a plurality of equally spaced helical grooves which extend longitudinally in a winding path from the head 12 to the conical point 14. The illustrated spike has two such grooves 16 and 18. The grooves 16 and 18 define a pair of equally spaced ridges or ribs 20 and 22. The grooves 16 and 18 are diametrically opposite each other on the shank 10. Each of the grooves 16 and 18 rotates approximately 120° from the conical point 14 to the head 12. The amount of the twist of the grooves 16 and 18 and the ridges 20 and 22 may vary somewhat depending on considerations such as the length and the diameter of the spike.

The outer surface of the ridges 20 and 22 is generally cylindrical. Each of the grooves 16 and 18 has a flat bottom surface 24 together with a clockwise edge surface 26 (Fig. 3) which is approximately perpendicular to the bottom surface 24. Each of the grooves 16 and 18 has a beveled counterclockwise edge surface 28 which makes an obtuse angle with the bottom surface 24. The beveled edge surfaces 28 form the lower edge surfaces of the ribs 20 and 22. The beveled surfaces 28 make obtuse angles with outer surfaces of the ribs. The clockwise edge surfaces 26 of the grooves 16 and 18 form the upper edge surfaces of the ribs 20 and 22. The surfaces 26 make acute angles with the cylindrical outer surfaces of the ribs.

A plurality of longitudinally extending integral ears 30 are positioned in the grooves 16 and 18. In the spike illustrated, a pair of diametrically opposite ears 30 are positioned about one-fourth of the way from the point 14 to the head 12, but additional ears may be provided if desired. The ears 30 are formed integrally with the shank 10 and have longitudinally oriented base portions 32 which join with the lower edges of the ribs 20 and 22. The ears 30 taper in a clockwise direction (Fig. 2) toward longitudinally extending apexes 34. The ears 30 curve outwardly slightly from their bases 32 to their apexes 34.

The ears 30 may be formed from material which is left intact when the grooves 16 and 18 are cut in the shank 10. The material may be separated from the shank 10 by a slicing or cutting operation and then bent outwardly to form the ears 30. The cuts which produce the ears 30 may be taken flush with the bottom surfaces 24 of the grooves 16 and 18. The cuts produce notches 36 in the upper edges of the ribs 20 and 22.

In Fig. 2 the initial position of each of the ears 30 is shown in dotted lines and the driven position in full lines. The positions are indicated by appropriate legends. An intermediate position is also shown in dotted lines. In their initial positions the ears 30 do not project beyond the height of the helical ribs 20 and 22, but rather lie wholly within the grooves 16 and 18. As the spike is driven into position, the ears 30 move outwardly, for the purpose to be described in greater detail presently, to assume their driven positions.

A spike having primarily a driving movement instead of a boring movement is desired. Consequently only two helical ribs 20 and 22 are provided on the spike and the ribs spiral or wind only about 120° from the point to the head of the spike. With this construction the spike 10 makes only about one-third of a turn when it is driven into holding position. This slight rotative movement lends assistance to the driving of the spike. However, there is only a minimum amount of wood fiber destruction when the spike is driven, since there is only a minor rotative movement of the spike. The long gradual spiral construction of the ribs 20 and 22 reduces the driving resistance offered to the spike and largely eliminates the possibility of splitting the material by reducing the likelihood of jamming or packing of the wood fibers as the spike 10 is driven.

In some cases it may be desirable to provide three or more grooves in the spike, particularly for large size spikes. The amount of twist given to the grooves may vary, less twist being desirable for large spikes than for small spikes.

The lower edges 28 of the helical ribs 20 and 22 are beveled so that they offer minimum resistance to movement of the spike into the material. The beveled construction minimizes destruction of wood fiber during driving of the spike. The sharp upper edge 26 of each of the helical ribs 20 and 22 lends assistance to the rotative driving of the spike into holding position. However, upon an attempt to withdraw the spike, the upper edges 26 act as shoulders which jam into the material and embed themselves in virgin fiber to resist positively any direct removal force. Since the upper edges 26 have substantial length, they provide substantial surface area to engage the material to resist a direct pull effectively.

For larger spikes additional ears may be provided spaced along the helical grooves. However, too many ears should be avoided since they may cause excessive maceration of the holding material when the spike is driven. The ears should be large enough to provide an effective bite into the fibers of the material.

The ears 30 in the grooves 16 and 18 are positioned diametrically opposite each other. The ears may be staggered instead, but a more effective spike results if the ears are directly opposite each other. With this construction the spike is balanced and a truer drive is obtained. Moreover, there is less tendency to distort the fibers of the material.

As the spike is driven into place by hammer blows applied to its head 12, the lower edges of the ears 30 cut into the material and feed wood fiber under the main body of the ears. The fibers force the ears outwardly away from the shank 10 until they project beyond the helical ribs 20 and 22 and outside the diameter of the aperture being made by the spike. It will be apparent that this movement of the ears beyond the periphery of the ribs causes the ears to bite into and become embedded in the solid fiber surrounding the spike. Thus the ears provide a very effective restraining means against a direct pull, and being embedded in virgin fiber, they offer positive resistance to any reverse turning of the spike. The ears, in their initial position, are located within the grooves 16 and 18 so that the ears are shielded by the walls of the grooves. The ears are so disposed that each has its lower or leading edge located in advance of the main body of the ear to receive a positive opening pressure from the wood fiber. There is no tendency for the ears to move inwardly toward the shank.

Beveling the upper edges 28 of the grooves 16 and 18 largely prevents crushing and jamming of the material by the edges as the spike is driven. As a result, only a minor pressure is applied to the outside of the ears. The pressure does not prevent the outward movement of the ears.

Any outward pull on the spike produces a tendency toward reverse rotation. Any reverse rotation tends to bend the ears 30 farther outward into the holding material, and thereby to anchor the spike more firmly in the material.

A spike constructed in accordance with the invention is a permanent type fastener which automatically locks itself in the material into which it is driven. It cannot be withdrawn from the material without the exertion of a very great pulling force. The force must be sufficient to rupture and split the fibers of the material and leave a gaping hole in the material.

Many of the details of the embodiment described above are merely illustrative and should not be taken as limitative. The invention may be practiced in many equivalent arrangements. The scope of the invention is indicated by the following claims.

I claim:

1. In a drive spike, a generally cylindrical shank having a helical groove to rotate the spike a fraction of a turn in a predetermined direction when the spike is driven, and an ear-like projection contained within said groove having a longitudinal edge fixedly attached to that edge of said groove which leads in reference to said rotation to restrain withdrawing rotation of the spike.

2. In a drive spike, a generally cylindrical shank having a helical groove to rotate the spike a fraction of a turn as the spike is driven, a flexible ear in the groove having a generally longitudinal edge fixedly attached to the shank, the ear projecting in a direction opposite the predetermined direction and being adapted to move outwardly away from the shank during a driving operation to anchor the spike against reverse rotation.

3. In a drive spike, a generally cylindrical shank having a helical groove to rotate the spike a fraction of a turn in a predetermined direction as the spike is driven, a bendable ear-like projection having a generally longitudinal edge fixedly attached to that edge of said groove which leads in reference to said rotation, the ear-like projection extending in a direction opposite the predetermined direction to anchor the spike against reverse rotation.

4. In a drive spike, a generally cylindrical shank having a helical ridge to rotate the spike a fraction of a turn during driving operation, the ridge having an upper edge surface making a sharp angle with the periphery of the ridge to form a shoulder for resisting withdrawal of the spike, the ridge having a beveled lower edge surface to facilitate driving of the spike, and a bendable ear having a generally longitudinal edge fixedly secured to the beveled lower edge surface of the ridge and extending adjacent said shank to trail in relation to the said rotation upon a driving operation.

5. In a drive spike, a generally cylindrical shank, a helical ridge on the shank to rotate the spike during a driving operation, an upper edge surface on the ridge making a sharp angle with the periphery of the ridge to form a shoulder for resisting withdrawal of the spike, and a beveled lower edge surface on the ridge to facilitate driving of the spike.

6. In a drive spike, a generally cylindrical shank having a pair of equally spaced helical grooves to rotate the spike a fraction of a turn during a driving operation, a pair of diametrically opposite ears in the respective grooves having respective generally longitudinal edges fixedly attached to the shank on the leading edge of said groove to project rearward with relation to said rotation of the spike upon driving, said ears being adapted to move outwardly beyond the periphery of the shank during a driving operation.

WILLIAM R. SELBY.

References Cited in the file of this patent

UNITED STATES PATENTS

| Number | Name | Date |
|---|---|---|
| 1,380,424 | Sessler | June 7, 1921 |
| 1,933,332 | May | Oct. 31, 1933 |
| 2,190,883 | Pauze | Feb. 20, 1940 |
| 2,327,556 | Purinton | Aug. 24, 1943 |
| 2,558,379 | Phipard | June 26, 1951 |